United States Patent [19]

Bielfeldt

[11] 4,430,059
[45] Feb. 7, 1984

[54] INJECTION PRESS

[75] Inventor: Friedrich B. Bielfeldt, Eppingen, Fed. Rep. of Germany

[73] Assignee: Maschinenfabrik J. Dieffenbacher GmbH & Co., Eppingen, Fed. Rep. of Germany

[21] Appl. No.: 350,032

[22] Filed: Feb. 18, 1982

[30] Foreign Application Priority Data

Feb. 20, 1981 [DE] Fed. Rep. of Germany ....... 3106379

[51] Int. Cl.³ .............................................. B29F 1/00
[52] U.S. Cl. ................................................... 425/190
[58] Field of Search .............................. 425/190, 542

[56] References Cited

U.S. PATENT DOCUMENTS 3,751,203  8/1973  Hehl .................................... 425/190
3,852,010 12/1974  Hehl ................................ 425/190 X
4,005,961  2/1977  Manceau ........................... 425/190

Primary Examiner—Thomas P. Pavelko
Attorney, Agent, or Firm—Schwartz, Jeffery, Schwaab, Mack, Blumenthal & Koch

[57] ABSTRACT

An injection press comprises a machine base and a machine bed which is lower than the machine base. A mold closure unit which contains a mold as one wall constructed to support the closure unit horizontally on an upper surface of the machine base. A bracket is pivotally attached between the mold closure unit and the machine bed and is of such a length to permit the closure unit to slide between first and second positions on the machine base. Means are provided for securing the bracket to the machine base when the closure unit is in the first position such that the closure unit may be pivoted upright while being supported by the bracket.

8 Claims, 5 Drawing Figures

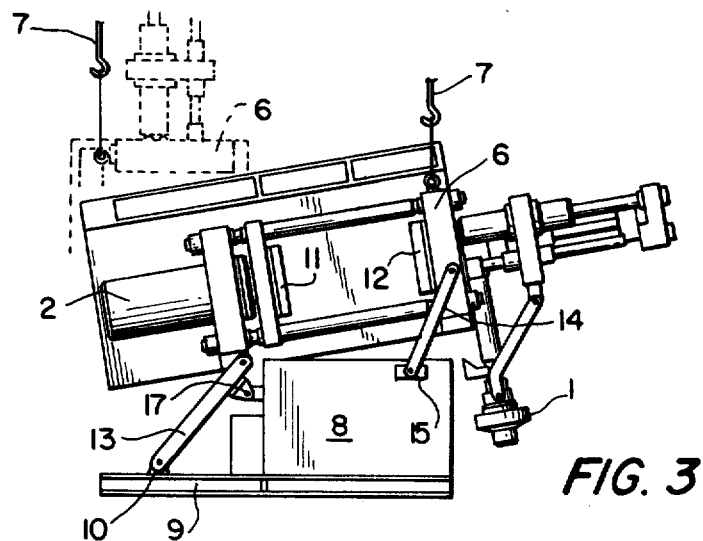
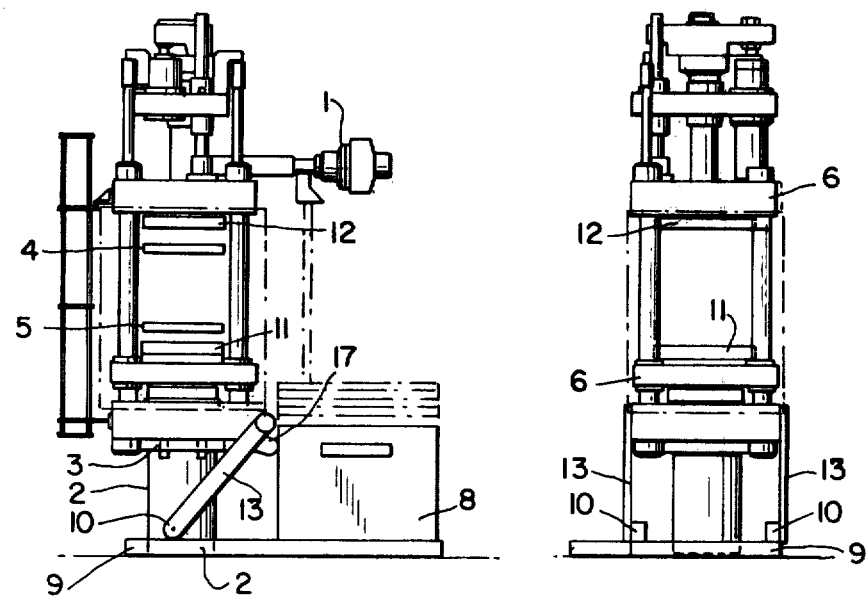

INJECTION PRESS

BACKGROUND OF THE INVENTION

1. Field of the Invention

The present invention relates to an injection molding press for processing hot deformable synthetic substances, rubber, metal or the like.

2. Discussion of Related Art

Usually, injection presses are built for vertical operation. However, in the processing of hot formable synthetic substances, rubber and the like, in industry, there are daily applications requiring the alternating use of a vertical or a horizontal press.

Different pivoting installations are known for small injection molding machines to enable operation in the vertical or the horizontal position. But these pivoting installations cannot be provided for heavy or superheavy injection presses, for example with a structural weight in excess of four tons, as for the weight to be moved the pivoting installation would be too large and expensive in relation to the entire assembly.

SUMMARY OF THE INVENTION

It is an object of the invention to provide an injection press of the aforedescribed heavy type, which may be operated economically both in the vertical and the horizontal operational position and the reversal whereof may be effected by simple means.

Using the arrangement and configuration according to the invention, the injection press may be employed selectively in the vertical or the horizontal position. The kinematics of pivoting require no drive system of their own and the structural elements may be produced simply and inexpensively. The injection press may be raised for pivoting by a crane, a trolley, block and tackle or a mobile lifting device, such as a fork lift or the like; these are already available in any industrial operations.

However, the pivoting equipment according to the invention may also be provided as additional equipment for any existing, suitable injection press, if an advantageous application for a horizontal operating position, for example removal from the mold by gravity, is present.

The cost of this additional equipment is only a fraction of that of an injection press. It is therefore advantageous that funds for the additional equipment must be invested only if there is actually a gain in efficiency to be obtained by a horizontal application.

BRIEF DESCRIPTION OF THE DRAWINGS

An embodiment of the invention will be described in detail hereafter with the aid of the drawings, in which:

FIG. 3 shows the injection press in the transport position, FIG. 4 shows the injection press in the vertical operating position in a front elevation and FIG. 5 shows the injection press of FIG. 4 in a side elevation.

DETAILED DESCRIPTION OF THE PREFERRED EMBODIMENT

Figure 1:
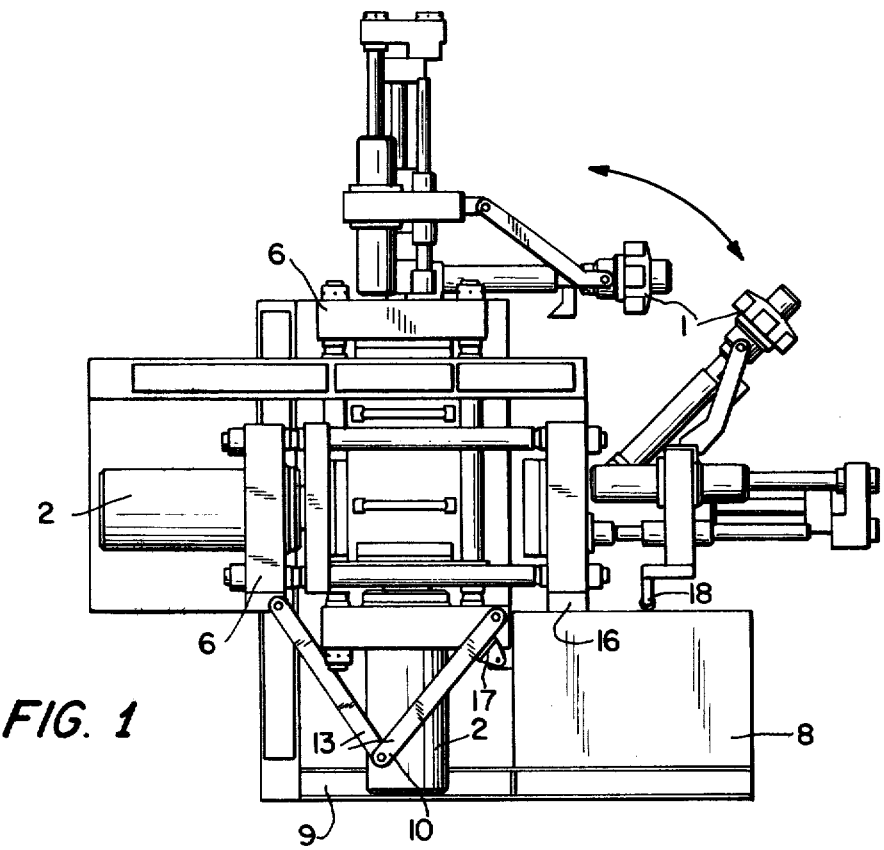
FIG. 1 shows the injection press in the vertical (shaded) and the horizontal operating position.

As shown in FIG. 1, the mold closure unit 6 may be operated selectively in a horizontal or a vertical (shaded) operating position. In the vertical position, the weight of the mold closure unit 6 rests on the driving vessel 2 for the hydraulic drive in the machine bed 9, designed as a base, while locking is effected by means of the pair of pivoting brackets 13 in two support bearings 17 on the machine base 8. The preplasticizer screw unit 1 is arranged in the vertical position of the mold closure unit 6 at an angle of 90° to the injection nozzle (not shown), while in the horizontal position it is secured at an angle of 30° to the axis of the mold closure unit 6, with the injection nozzle rotated by 180°.

Figure 2:
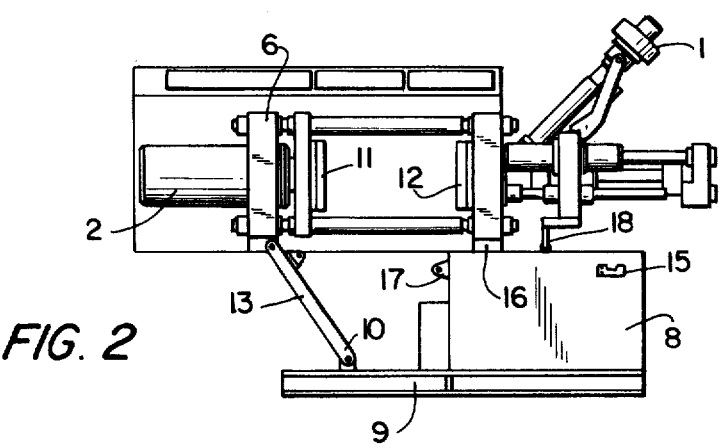
FIG. 2 shows the injection press in the horizontal operating position.

FIG. 3 shows the injection press in the transport position, i.e. when it is being rotated from the vertical position into the horizontal position by means of a hook 7 of a lifting tool or vice versa, by raising. In this position the preplasticizer screw unit 1 is also pivoted, as shown in FIG. 2.

The moving pivoting equipment consists of the two pairs of pivoting brackets 13 and 14, supported in the rotating and support bearings 10 and 15. Following the release of the pair 13 of pivoting brackets from the support bearing 17, the mold closure unit 6 may be moved into its horizontal operating position, as shown in FIG. 2, by a type of parallelogram displacement. It is then automatically secured in a fixed point support 16. The displacement of the mold closure unit 6 may be facilitated by rolls 18, attached to said unit and rolling along the top side of the machine base 8.

FIGS. 4 and 5 further show the arrangement of the insertable and extractable mold halves 4 and 5, for the separation of which a separating device 3 is provided. The heating plates 11 and 12 are arranged above and under the mold halves 4 and 5.

What is claimed is:

1. An injection press for the processing of hot deformable substances, comprising:
    a machine base having a first vertical height and an upper support surface;
    a machine bed having a second vertical height lower than said first vertical height;
    a mold closure unit having a pivot point and containing a mold, said mold closure unit having one wall constructed to support said mold closure unit horizontally on said upper support surface;
    a preplasticizing unit attached to said mold closure unit;
    a support bearing attached to said machine bed;
    a first bracket pivotally attached between said support bearing and said mold closure unit pivot point, said support bracket having a length permitting said mold closure unit to be moved between a first horizontal position on said upper support surface, wherein said pivot point is adjacent said machine base, and a second horizontal position in said upper support surface while said bracket pivots between corresponding first and second positions;
    means for securing said bracket to said machine base when said mold closure unit is in said first position such that said mold closure unit may be pivoted to an upright position about said pivot point while being supported by said first bracket.

2. An injection press according to claim 1, including a second bracket pivotally attached between said machine base and said mold closure unit for producing parallelogram displacement of said mold closure unit when said unit is moved between said first and second positions.

3. An injection press according to claim 1, including a stationary support on said machine base for holding said mold closure unit in said second position.

4. An injection press according to claim 1, including rollers mounted to said mold closure unit for supporting said mold closure unit during movement between said first and second positions.

5. An injection press according to claim 1, wherein in the horizontal position of the mold closure unit, said preplasticizing unit is attached at an angle of 30°.

6. An injection press according to claim 5, wherein said mold closure unit includes an injection nozzle which is rotatable by 180°.

7. An injection press according to claim 1, wherein said securing means comprises at least one support bearing on said machine base, said bearing being positioned to engage said first bracket.

8. An injection press according to claim 1, wherein said mold closure unit includes a drive vessel and wherein said pivot point is positioned in said mold closure unit such that, in the vertical position, said drive vessel rests on said machine bed.

* * * * *